March 4, 1924.
W. J. HIGGINS
STEERING COLUMN STABILIZER
Filed July 10, 1922
1,485,922
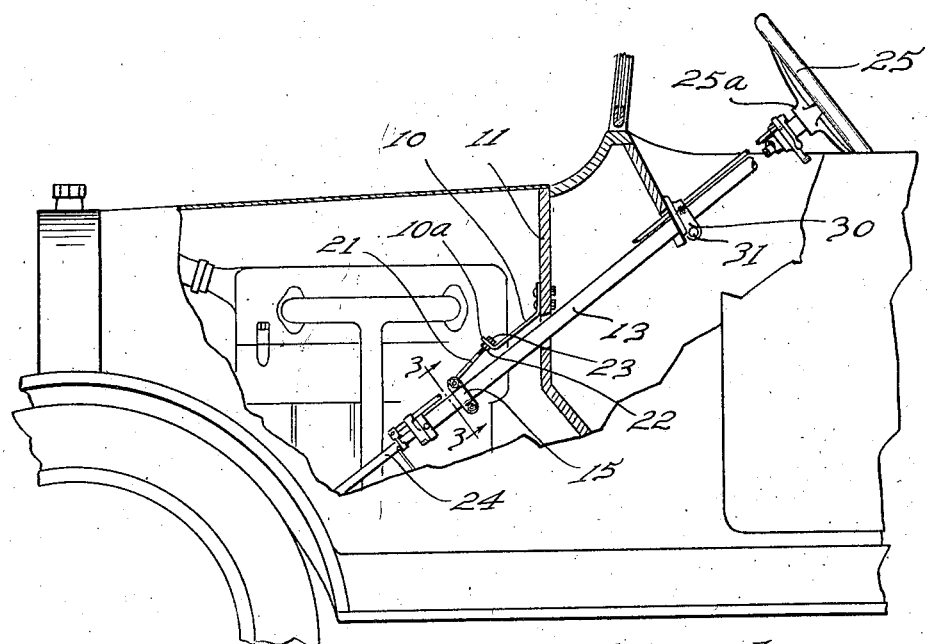
Fig.-1.
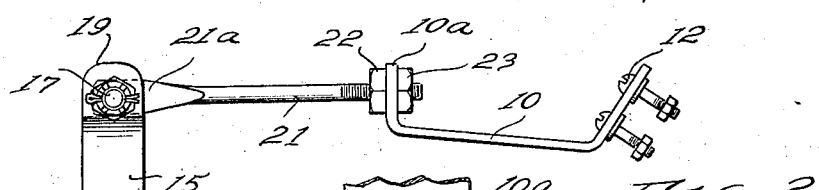
Fig.-2.
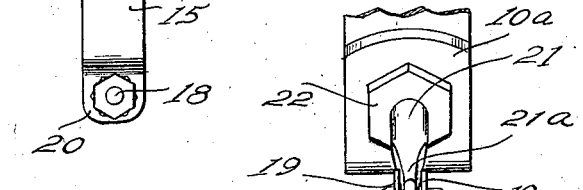
Fig. 3
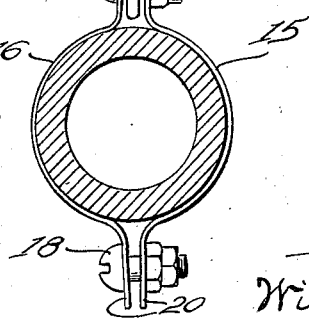
INVENTOR
William J. Higgins
By Bates & Macklin,
ATTORNEYS Patented Mar. 4, 1924.

1,485,922

UNITED STATES PATENT OFFICE.

WILLIAM J. HIGGINS, OF LAKEWOOD, OHIO.

STEERING-COLUMN STABILIZER.

Application filed July 10, 1922. Serial No. 573,999.

*To all whom it may concern:*

Be it known that I, WILLIAM J. HIGGINS, a citizen of the United States, residing at Lakewood, in the county of Cuyahoga and State of Ohio, have invented a certain new and useful Improvement in Steering-Column Stabilizers, of which the following is a full, clear, and exact description, reference being had to the accompanying drawings.

This invention is directed to improvements in steering mechanisms of automobiles, and is more particularly concerned with the provision of means for bracing and adjusting the steering column with relation to the steering wheel of the vehicle.

It is a prevailing practice in the manufacture of automobiles to suspend the steering column by a bracket secured to the instrument board of the vehicle, and to depend upon the stabilizing influence of the steering rod or post to prevent vibration of the steering column. The construction usually comprises a tubular member in the nature of a non-rotatable steering column provided with bushings or bearings inserted in the upper and lower ends thereof which support the steering post. After a season's use of the vehicle, however, the bushings in the steering column frequently become worn with the result that the steering post and wheel vibrate and cause considerable annoyance to the driver. Likewise the single bracket suspension of the steering column is liable to permit the column also to vibrate relative to the wheel and steering post.

My invention is directed to the provision of an adjustable steering column brace suitably anchored and engaging the steering column in such manner that the column may be adjusted longitudinally of the steering post. The preferred construction of the brace is such that it may be readily secured to the dash-board and be disposed beneath the hood of the vehicle.

Other objects will become apparent from the following description, which refers to the accompanying drawings, the essential characteristics being summarized in the claims.

In the drawings, Fig. 1 is a side elevation of the forward part of a vehicle showing the relative position of my device or attachment; Fig. 2 is a side view of the device detached from the vehicle; Fig. 3 is an enlarged cross sectional view, taken substantially along the line 3—3 of Fig. 1.

For convenience in illustrating a particular application of my attachment to the steering mechanism of the vehicle, I have shown in Fig. 1, a section taken through the dashboard and cowl of an automobile in the same plane in which the steering column and post lie. In this figure, I have shown my attachment as comprising a bracket member 10 secured to the inner side of the dashboard 11 of the vehicle by suitable bolts 12. The bracket member may extend downwardly substantially parallel with the steering column 13 and terminate in an upturned perforated portion $10^a$. Semi-circular clamp members 15 and 16 engage the steering column 13 adjacent the lower end thereof and may be maintained in clamped engagement therewith by suitable bolts 17 and 18 passing through perforated lateral extensions 19 and 20 formed on the clamp members.

The clamp members are connected to the bracket member 10 by an adjusting rod 21 having the upper end thereof suitably threaded for the mounting of lock nuts 22 and 23 which maintain the rod in adjusted engagement with the bracket member 10. The lower end of the rod may terminate in a suitable eyeleted portion $21^a$ disposed between the lateral extensions 19 of the clamp members 15 and 16 and may be engaged by the clamp bolt 17.

When it is desired to adjust the steering column 13 longitudinally of the steering post, the lock nut 23 may be loosened. The lock nut 22 may then be adjusted downwardly, after which the column bracket 30, secured to the instrument board, may be loosened by releasing a clamp bolt 31. The lock nut 23 may then be turned to draw the adjusting rod 21 and the clamp members 15 and 16 and steering column 13 upwardly until the end of the steering column is in comparatively snug engagement with the hub $25^a$ of the wheel 25. The lock nut 22 may then be tightened and the clamp bolt 31 may again draw the column bracket into tight engagement with the column.

It is to be understood that the means for accomplishing this adjustment between the steering column and steering wheel may be embodied in a variety of suitable forms; this particular embodiment being preferred for its simplicity and convenience of illustration. It is to be also noted that while the device is primarily directed to adjusting the steering column longitudinally of the steering post, it has at the same time, a stabilizing effect in that it also constitutes a support for the lower portion of the steering column and thereby decreases the amount of wear which takes place between the steering post and the bushings carried by the steering column.

I claim:—

1. The combination with the steering column of an automobile, of an adjustable device connected to said column and to a stationary part of the car and adapted when adjusted to move the column upwardly to take up the slack between it and the hub of the steering wheel.

2. In an automobile, the combination of clamping means secured to the steering column of a vehicle beneath the hood thereof, and an adjustable device connected to said clamping means and to the dashboard of the vehicle and movable longitudinally of the steering column, whereby the steering column may be adjusted longitudinally of the steering post of the vehicle to eliminate unnecessary looseness therebetween.

3. In an automobile, the combination of clamping means secured to the steering column of a vehicle, a bracket member rigidly fixed to the vehicle, and adjustable means connecting said clamping means with the bracket whereby the steering column may be adjusted longitudinally.

4. In an automobile, the combination with the steering column of the automobile of a suitably supported bracket member having a downwardly projecting portion extending substantially parallel with the steering column and terminating in an upwardly projecting perforated portion, and a connecting member pivotally connected with the steering column and adjustably connected to said bracket member.

5. In an automobile, the combination of a clamping device secured to the steering column of the vehicle, a bracket member rigidly fixed to the inner side of the dashboard of the vehicle beneath the hood thereof, said bracket having a downwardly projecting portion extending substantially parallel with the steering column, and a connecting member pivotally engaging the clamping device and adjustably connected to said bracket member.

6. In an automobile, the combination with a steering column, a steering post within the column a bracket member rigidly fixed to the dashboard of the vehicle and having a portion thereof extending substantially parallel with the steering column, and an adjusting rod pivotally connected to the column and having a threaded portion extending through an eye of the bracket, and nuts on said threaded portion adapted to effect an upward adjustment of the steering column relative to the steering post by raising the column against the hub of the steering wheel carried by the steering post.

7. In an automobile, the combination of a steering column, a steering post within the column, clamping members circumferentially engaging the lower portion of the steering column, a bracket member rigidly fixed to the dashboard of the vehicle and having a portion thereof extending substantially parallel with the steering column, and an adjusting rod pivotally engaging said clamping members and adjustably secured to the downwardly extending portion of said bracket, whereby the tensioning of the rod will effect an upward adjustment of the steering column relative to the steering post acting upon the hub of the steering wheel carried by the steering post.

In testimony whereof, I hereunto affix my signature.

WILLIAM J. HIGGINS.